C. YACKEL.
LIFTING INSTRUMENT.
APPLICATION FILED APR. 15, 1918.
1,336,461.
Patented Apr. 13, 1920.
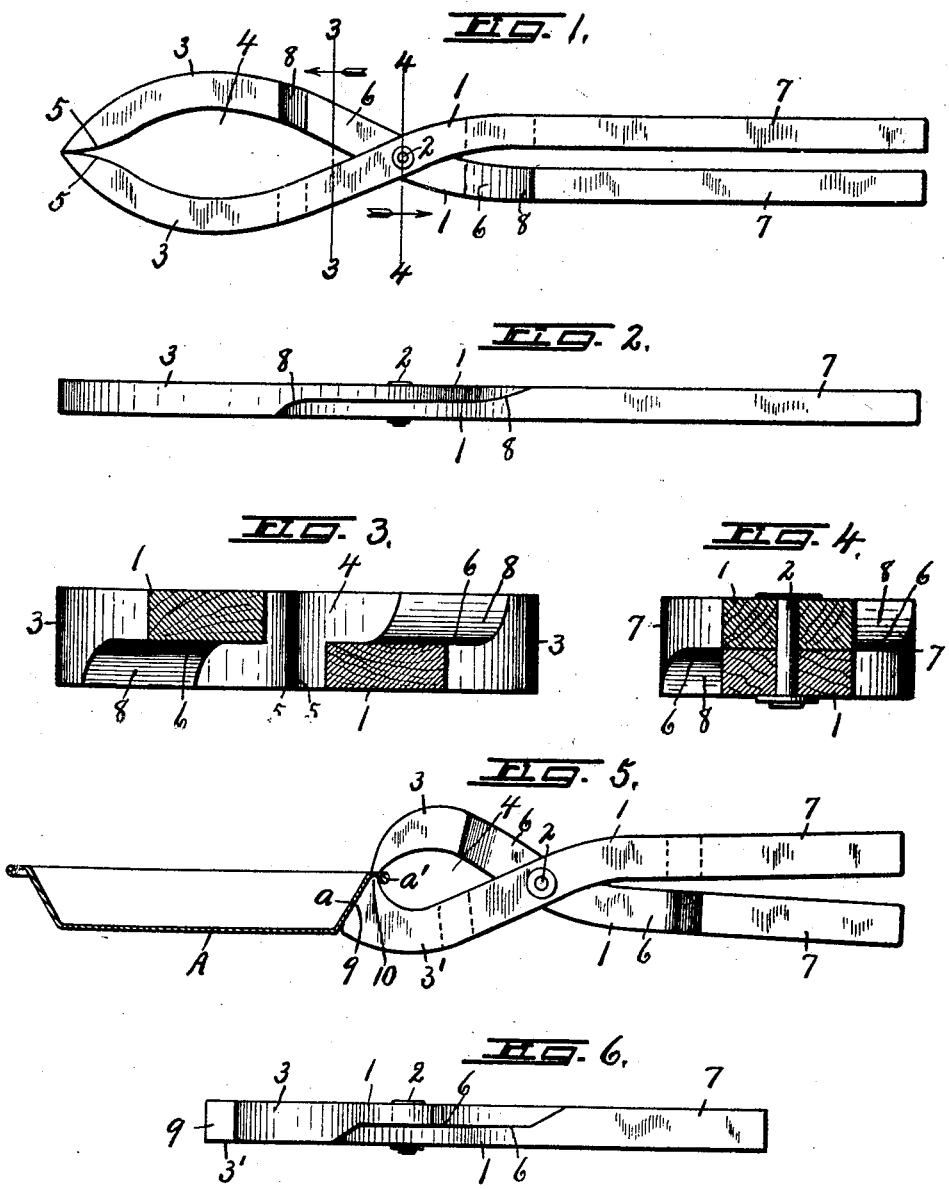

UNITED STATES PATENT OFFICE.

CARL YACKEL, OF SYRACUSE, NEW YORK.

LIFTING INSTRUMENT.

1,336,461.  Specification of Letters Patent.  Patented Apr. 13, 1920.

Application filed April 15, 1918. Serial No. 228,611.

*To all whom it may concern:*

Be it known that I, CARL YACKEL, a subject of the Emperor of Germany, and resident of Syracuse, in the county of Onondaga, in the State of New York, have invented new and useful Improvements in Lifting Instruments, of which the following, taken in connection with the accompanying drawings, is a full, clear, and exact description.

This invention relates to certain improvements in lifting instruments of the tong-pincer type adapted to be used for handling heated articles, as for example manipulating clothes in boiling water in a laundry tub or boiler, placing and removing pie tins in and from an oven, and in other relations where such an instrument might be of service.

The main object is to construct and assemble the pivoted members of the tongs or pincers in such manner as to leave a clear open space of approximately elliptical cross section between the adjacent edges of the jaws when the gripping points thereof are in contact so that portions of the articles gripped between said ends may have free play in the open space.

Another object is to recess the contiguous faces of the intersecting portions of both pivoted members to the same degree substantially equal to the thickness of said intersecting portions, and to extend said recesses longitudinally along the jaws and handles a sufficient distance to allow a maximum opening and closing of the jaws without actually bringing the handles into contact when the jaws are closed, thus affording a finger space between the handles at all times to facilitate their free manipulation with one hand in opening and closing the jaws upon the article.

A further object is to avoid any possibility of shearing said article by the portions of the jaws adjacent the pivot.

That is to incline the adjacent edges of the heels of the jaws nearest the pivot so that if an article should be impinged between such portions, the inclined edges would tend to force such articles away from the pivot instead of producing a shearing effect thereon.

Other objects and uses relating to specific parts of the tongs will be brought out in the following description.

In the drawings—

Figures 1 and 2 are, respectively, a face view and an edge view of a clothes tongs embodying certain features of my invention.

Figs. 3 and 4 are enlarged transverse sectional views taken, respectively, on lines 3—3 and 4—4, Fig. 1.

Figs. 5 and 6 are, respectively, a face view and an edge view of a tongs for handling pie tins and similar receptacles as a modification of the form shown in Figs. 1 to 4, inclusive.

The tongs shown in Fig. 1 comprises two similar members —1— of the same size and form, but arranged in reverse order so as to cross each other, and are pivotally connected at their intersections by a bolt or rivet —2—, the portions of said members at one side of the pivot being arched longitudinally in opposite directions to form longitudinally concavo-convex jaws —3— having their concave edges facing each other to form a longitudinally elongated opening —4— when the free ends of the jaws are closed one upon the other, as clearly shown in Fig. 1.

The jaws —3— are of the same form and size and the major portions thereof are disposed in the same plane at right angles to the pivot —2— so that the extreme ends of their adjacent edges may be brought into contact and inclosed, leaving the remaining portions of the concave edges spaced some distance apart, said extreme ends being slightly convexed longitudinally at —5— to assure a positive grip upon the article, such as clothes, without liability of cutting or otherwise mutiliating the same.

In order that the major portions of the jaws may be brought into the same plane as previously described, the adjacent faces of the intersecting portions of both parts are recessed longitudinally at —6— to the same depth or degree substantially equal to half the thickness of the major portions of the jaws, and these recesses are extended longitudinally considerable distances beyond and to opposite sides of the pivot —2— along the adjacent portions of the jaws —3— and handles —7—, thereby leaving sufficient clearance between the inner ends of the overhanging portions of the jaws to avoid any possibility of shearing or biting engagement between said overhanging portions.

In other words, when the jaws are closed, the opening —4— extends a considerable distance beyond the outer ends of the recesses —6— toward the pivot —2— so that the adjacent edges of the recessed portions of the jaws incline or diverge from each other away from the pivot —2— to reduce to a minimum the liability of the clothes becoming caught and mutilated between those portions of the jaws.

The major portions of the handles —7— are straight and substantially parallel, but in spaced relation when the jaws are closed, said handles being slightly curved toward each other as they approach the pivot —2—.

Furthermore, the major portions of the handles between the recesses —6— are disposed in the same plane as the major portions of the jaws —3—, the recesses —6— being extended from the pivot —2— along the handles to the adjacent ends of the straight portions thereof so as to allow the straight portions of the handles to approach each other without shearing or biting engagement one with the other to avoid any liability of pinching the fingers between them, even though the hand of the operator may be brought reasonably close to the pivot.

Both of the pivotally connected members of the tongs or pincers are preferably made of hard wood and are substantially rectangular or square in cross section so that the faces thereof are uniformly smooth and flat in cross section, while their outer faces are uniformly smooth and flat from end to end, the adjacent faces of the crossing portions being also flat and smooth, except that the portions thereof at the ends of the recesses are curved or beveled, at —8—, as shown more clearly in Figs. 2, 3 and 4.

The tongs shown in Figs. 5 and 6 are quite similar to that shown in Figs. 1 to 4, inclusive, except that one of the jaws, as —3'—, has a relatively broad and beveled end bearing face —9—, the lower edge of which protrudes some distance beyond the biting edge of its companion jaw —3— to conform as closely as possible to the inclined side, as —a—, of a pie tin or equivalent utensil —A—.

The biting edge, as —10—, of the jaw —3'— is narrow, but rounding or sharply convexed, to more readily enter the groove in the under side of the ribbed flange, as —a—, running around the marginal edge of the tin —A—, thereby assuring a more positive grip of the jaws when closed upon that portion of the tin to hold said tin against displacement without excessive pressure of the operator upon the handles, the beveled face or recess —9— serving to additionally support the body of the tin when its marginal —a'— is gripped between the biting edges of the jaws.

Otherwise, the construction of the members of the tongs is similar to that previously described for the construction shown in Figs. 1 to 4, inclusive.

What I claim is:

A lifting instrument for pie tins comprising two levers crossing each other and pivoted together at the crossing, said levers having handles at one side of the pivot and jaws at the opposite side of said pivot, said jaws having biting edges at their extreme outer ends, the portions of the jaws between the biting edges and pivot being arched in opposite directions from each other, one of said jaws having a substantially straight end face inclining downwardly and forwardly from its biting edge, the other jaw terminating at its biting edge a distance from the pivot corresponding to the distance between said pivot and the biting edge of the opposite jaw so as not to lap upon the straight inclined face of the last-named jaw when the jaws are closed.

In witness whereof I have hereunto set my hand this 8th day of April, 1918.

CARL YACKEL.

Witnesses:
 H. E. CHASE,
 ALICE M. CANNON.